Sept. 30, 1947.    O. R. CLOUGH    2,428,144
LOADING MEANS FOR TRUCKS
Filed July 24, 1945

Orman R. Clough,
INVENTOR.

BY
ATTORNEY.

Patented Sept. 30, 1947

2,428,144

UNITED STATES PATENT OFFICE 2,428,144

LOADING MEANS FOR TRUCKS

Orman R. Clough, Long Beach, Calif.

Application July 24, 1945, Serial No. 606,849

1 Claim. (Cl. 214—65)

This invention relates to an adjustable flooring for trucks and freight platforms.

It not infrequently happens, in loading heavy freight onto or in removing it from platforms and truck bottoms, that the articles to be handled have flat bottom surfaces and that it is therefore necessary to tilt them manually in at least one direction and oftentimes in opposite directions before a chain or the hook of a hoisting crane can be placed under them to lift them so as to move them from a supporting floor onto a truck, or vice versa. It is an important object of the present invention to overcome this difficulty by providing a flooring for trucks, moving vans, freight platforms and the like, which is convertible from a floor with a smooth flat surface to one having a multi-grooved or channeled-surface to make it possible, without tilting the object to be moved, to pass a chain thereunder, or insert point portions of hooks under different bottom edge portions thereof, preparatory to mechanically lifting the freight item as the initial step in removing it to a different situation.

It is another object of this invention to provide a longitudinally slidable hoist-supporting beam attached to the roof of a truck, which may be extended to provide a carrier means projectable beyond the open end of the truck for conveying the freight item from a truck to a freight platform, or vice versa.

Yet another object of the invention is to provide an improved arrangement of hinge-attached, floor-forming members permitting their movement from a horizontal to a vertical position and vice versa, in order to make it possible to convert the floor at will, or desired portions thereof, to and from a multi-grooved or channeled condition.

Other objects, advantages and features of invention will hereinafter appear.

Referring to the accompanying drawing, which illustrates what is at present deemed to be a preferred embodiment of the invention, Fig. 1 is a side elevation with the truck body shown in vertical section, the flooring being shown in its normal position and a box supported thereabove by a connection extending transverse to the longitudinal axis of the floor boards.

Figure 3:
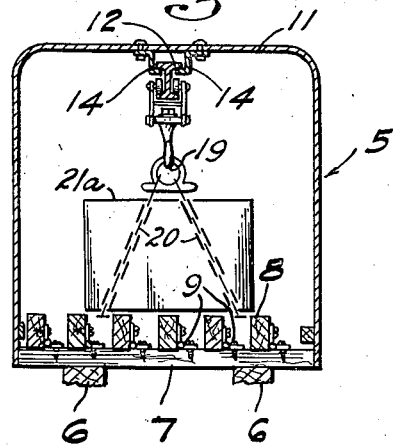
Fig. 3 is a reproduction of the showing of Fig. 2, except that the flooring is shown adjusted to the channel-forming position and a box is shown suspended by a connection led therearound in a direction parallel to the longitudinal axis of the floor boards.

Referring in detail to the drawing, the truck 4 comprises a tonneau 5, a pair of longitudinal chassis members 6 supporting the conventionally arranged transverse beams 7 which, in turn support the series of relatively thick floor boards 8. Said transverse beams 7 are shown spaced considerably apart in relation to the length of the tonneau 5, but the floor boards 8 are preferably placed as close to each other as is possible without interfering with the action of the hinges 9 whereby said floor boards are hinged to the floor beams 7. It is necessary that each floor board be hinged to at least two of the floor beams, and each board may be hinged to all four of the beams shown in Fig. 1. Each hinge 9 of each floor board is shown attached near one of the long edges of the board with which it is connected and in such a manner that when the opposite long edge portion of the board is swung upwardly said boards will upstand in an edgewise manner as shown in Fig. 3, thereby greatly widening the spaces between adjacent boards, as compared with the showing of Fig. 2. When the floor boards (which are shown rectangular in cross section) are in the down swung position of Fig. 2 they are supported superjacently to the floor beams 7 by the broad, superimposed wings of the hinges 9 being interposed between the flooring and the floor beams 7, but when the floor boards are in their upswing position, each board rests in an edgewise manner with its lower side engaging in a face to face manner with the floor beams 7.

It is obvious that the adjustable flooring may underlie other housing structures than the tonneau 5, without departing from the spirit of the claimed invention. Also the floor boards 8 are shown hinged to the beams 7 in such a manner that the upswinging movement of each board is leftward as viewed in Figs. 2 and 3, all the boards being swung in the same direction to bring them to their upstanding positions, there being normally a space 8a along the outer edge of the most leftward board, and a narrow floor piece 8b beyond said space. The outer ends of the leaves of the hinges are shown extending a little beyond the medial line of the down-swung boards so as to afford a more stable support for heavy freight stored upon the flooring for long periods of time.

Even when the flooring is in the normal or down-swung position the spaces between adjacent boards are sufficiently wide to admit a suitable thin tool to catch under and upswing the individual boards. However, the workman can ordinarily readily obtain access to the flooring at the spacious door or open end of the housing or tonneau so as to manually swing the flooring up or down.

The tonneau 5 is of a strong, substantially built character, making it possible to utilize its top wall 11 to support an extensible track member 12 together with the loaded carriage 13 that travels along said track member. Said track member 12 consists of a broadly flanged I-beam which is shown slidably supported from the wall 11 by means of a pair of opposed cross sectionally Z-shaped hanger members 14 secured to said wall by fastening members 15. When thus attached the lower flanges 16 and 17 of said Z-shaped members are directed horizontally toward each other, a sufficient gap being left between them for the loose reception of the web portion of the I-beam track 12. The upper flanges of said I-beam track thus serve to support it, while its lower flanges afford rails along which travel the wheels 18 of the conventional hoist carriage 13.

Figure 1:
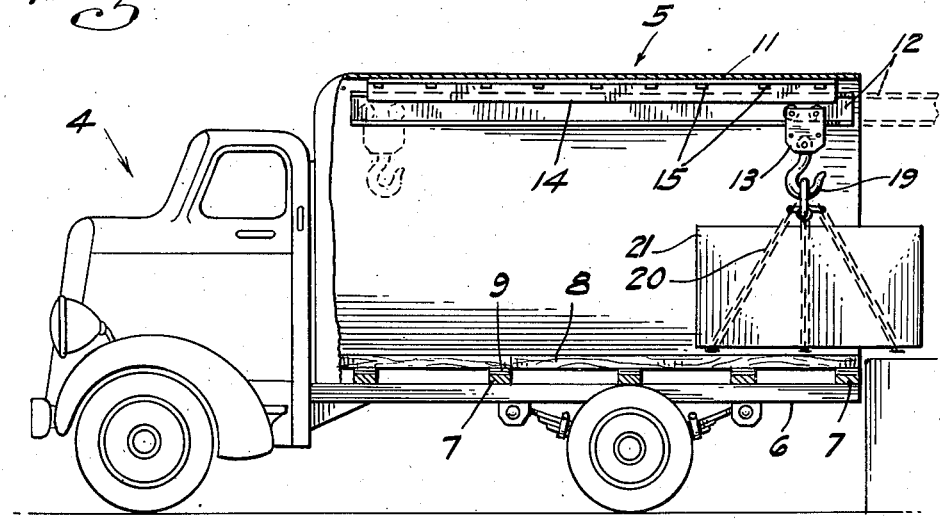
Figure 2:
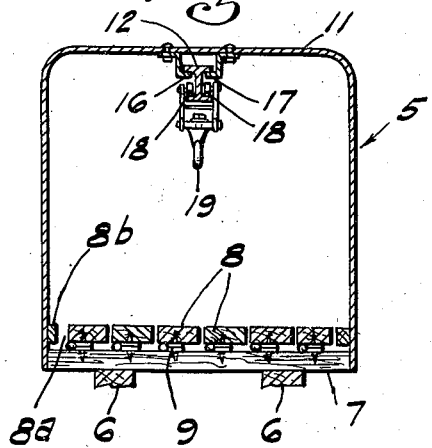
Fig. 2 is a vertical cross section taken through the midlength portion of the truck body shown in Fig. 1, looking from left to right, the flooring being shown in its normal position.

In Fig. 1 the hook 19 of the carriage 13 is shown furnished with lifting connections comprising a chain 20 having three downwardly diverging runs depending from said hook and underlying a quadrilinear object 21, for example, a bale of hay or a heavily loaded box, and the chain runs 20 are shown disposed transverse to the longitudinal axis of the boards 8, while in Fig. 3 the hook 19 of the carriage 13 is shown furnished with lifting connections comprising a chain 20a having two downwardly diverging runs depending from the hook and underlying a quadrilinear object 21a similar to the object 21 but with this difference however. In said Fig. 3 the chain runs are shown disposed parallel to the longitudinal axis of the boards 8.

What is claimed is:

The combination, with a housing having a door or open side for delivery of the housed freight and for admission of freight, of an elongated overhead hanger means one end portion of which is directed toward said door, a track member supportable by and movable along said hanger means so that an end portion of said track member is projectable from and withdrawable into the space inclosed by said housing, a hoist carriage traveling on said track member, and a lifting connection for said carriage; of a flooring for said housing consisting of a plurality of parallel, spaced apart floor beams, a series of floor boards rectangular in cross section hinged to said beams so as to be closely spaced when disposed in flatwise position and to be disposed a considerable distance apart when on edge whereby to admit said lifting connection under an object to be lifted when the latter is resting upon said flooring.

ORMAN R. CLOUGH.

REFERENCES CITED

The following references are of record in the file of this patent:

UNITED STATES PATENTS

| Number | Name | Date |
|---|---|---|
| 1,305,631 | Travell | June 3, 1919 |
| 1,433,644 | Palmer | Oct. 31, 1922 |
| 1,531,932 | Haun | Mar. 31, 1925 |
| 1,614,769 | Amsler | Jan. 18, 1927 |
| 1,676,307 | Winter | July 10, 1928 |
| 1,877,066 | Shadle | Sept. 13, 1932 |
| 2,239,135 | Wehr | Apr. 22, 1941 |
| 2,298,851 | Wachter | Oct. 13, 1942 |